Figure 1:
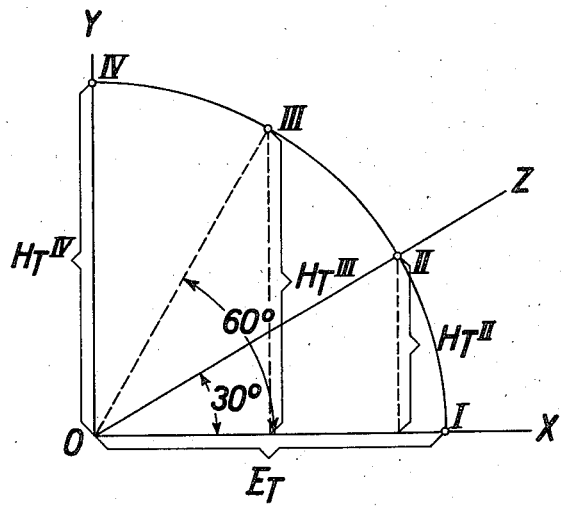

Feb. 23, 1937.  K. PAPELLO  2,071,425
CALCULATING APPARATUS FOR FIRING DIRECTORS
FOR SHOOTING AT MOVING AERIAL TARGETS
Filed Dec. 11, 1934   2 Sheets-Sheet 1

Inventor:
Karl Papello

Patented Feb. 23, 1937

2,071,425

UNITED STATES PATENT OFFICE 2,071,425

CALCULATING APPARATUS FOR FIRING DIRECTORS FOR SHOOTING AT MOVING AERIAL TARGETS

Karl Papello, Jena, Germany, assignor to the firm N. V. Nederlandsche Instrumenten Compagnie "Nedinsco", Venlo, Netherlands Application December 11, 1934, Serial No. 757,076
In Germany December 12, 1933

1 Claim. (Cl. 235—61.5)

Application has been filed in Germany, December 12, 1933.

The invention concerns a calculating apparatus of the kind which can be used with any gun (for instance a gun on board ship) for shooting at any moving aerial target, and into which is fed the range or height of target and the altitudinal angle of the point of impact, and which furnishes the range of the point of impact, the said apparatus containing a plotting ribbon displaceable rectilinearly and with constant speed, a plotting pencil displaceable at right angles to the moving direction of the said ribbon and adjustable by means of an adjusting device according to the range of the target, and a ruler disposed on two slides adjustable at right angles to the moving direction of the said ribbon and connected to each other for equal adjustments. One of these slides may be given additional adjustments. The ruler is mounted on the two slides in such a manner as to be rotatable about the said one slide, viz. about an axis at right angles to the plotting ribbon, and that it may be displaced lengthwise on a guide which is so disposed on the other slide as to permit rotation of the ruler about an axis at right angles to the plotting ribbon.

With a view to determining the range of the point of impact, a calculating apparatus of this kind is so constructed according to the invention that the axis of rotation of the ruler and the point of the plotting pencil lie in a plane at right angles to the direction in which the plotting ribbon is moving, that the said other slide is supported by a runner displaceable in the moving direction of the plotting ribbon, and that there are two cams which are rotatable and displaceable. The one of these two cams is coupled to the said runner and so constructed that that component of the distance apart of the said two axes which lies in the direction of displacement of the plotting ribbon continuously corresponds to that magnitude of the time of flight of the projectile to the point of impact on the aerial target according to which the cam is adjusted as regards the altitudinal angle of the point of impact and happens to be adjusted as regards the range of the point of impact. The other of the said cams is coupled to the said two slides and so constructed that the axis of rotation of the said guide is permanently adjusted in the direction of displacement of the slides to that magnitude of the range of the point of impact according to which the cam happens to be adjusted.

As the variation of the height of the aerial target is generally not as great as that of the distance of this target, it has proved to be advantageous to use the measured height of the aerial target for calculating with apparatus of the described kind. Using the height is, however, not advantageous when the angle included by a horizontal line and the sighting line to the target, namely the altitudinal angle, is small, since in this case even small errors as regards height may entail considerable errors as regards range. It is therefore convenient to take the range as a basis for the calculations when the aerial target is within small altitudinal angles and to base the calculations on the height of this target when this target is within wide altitudinal angles.

According to the invention, a simple apparatus of this kind is obtained when the cam coupled to the said two slides is connected to a driving device, so that it may be adjusted according to the altitudinal angle of the point of impact by rotating it about its axis, and when this cam is given such a construction that the bounding line of the area of each cross section at right angles to the axis of this body represents two parts whose points correspond in two adjacent fields of the altitudinal angles, to points of impact of equal ranges and of different altitudinal angles, the one of these parts corresponding to the field of small altitudinal angles and being a circular arc, and the other of these parts corresponding to the field of great altitudinal angles and being a sinusoidal line. In each cross section, the radial distances of a circle of small radius (or having even the radius zero) concentric to the circular arc from the points of the circular part represent the said equal ranges, and the radial distances of the said circle from the points of the sinusoidal part represents the heights coordinated to those points of impact which are at equal ranges and different altitudinal angles, these radial distances being represented on that scale on which the radial distances of the said circle from the said two linear parts are equal as regards the point of impact on the line separating the two fields of the altitudinal angle.

The two cams are suitably coupled to each other for equal rotation about one and the same axis and for equal displacement along this axis.

Figure 3:
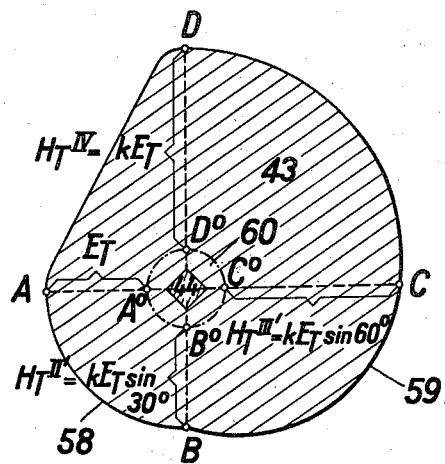
Figure 2:
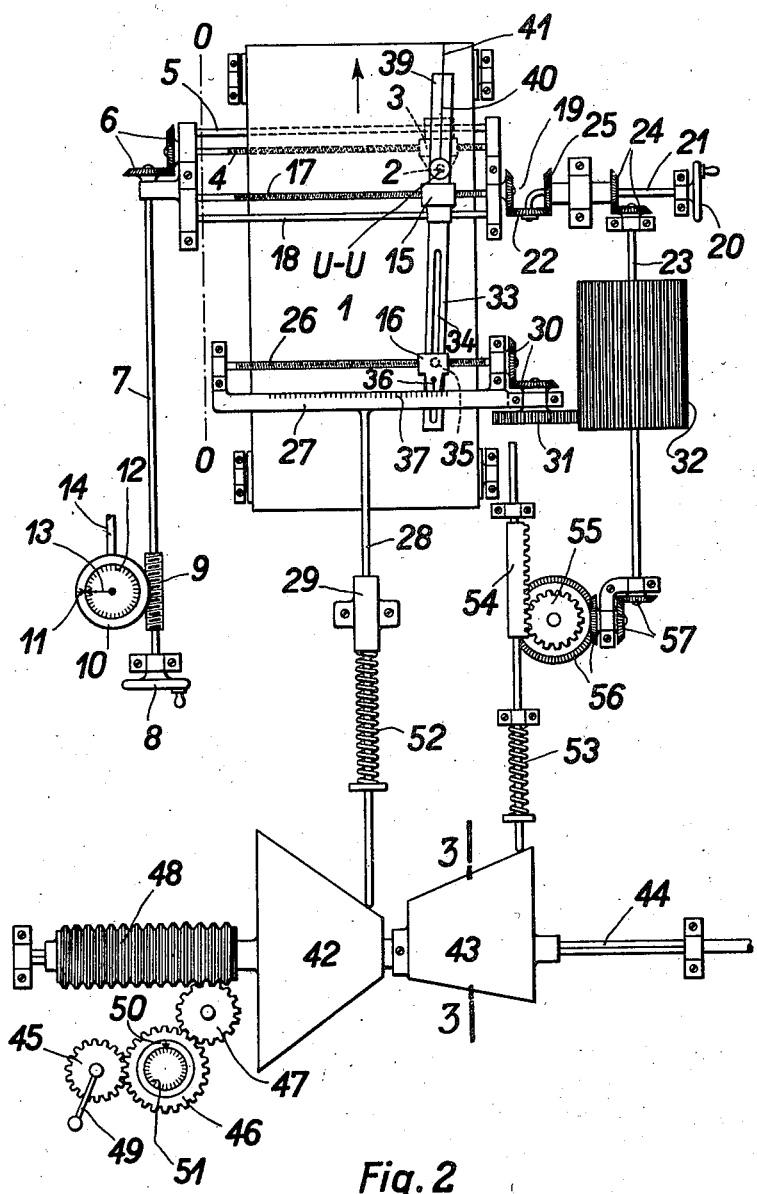

In the accompanying drawings, Figure 1 is to explain a basic idea of the invention, Figure 2 represents schematically a top view of an apparatus according to the invention, and Figure 3 shows on an enlarged scale a cross section through the one cam according to the line 3—3 indicated in Figure 2.

In Figure 1, OX and OY are the horizontal and the vertical axis, respectively, of a coordinate system of axes. The line OZ divides into two fields the quadrant determined by the two axes, the one field, which is determined by the angle XOZ, corresponding to positions of an aerial target which lie within altitudinal angles from zero to 30°, and the other field, which is determined by the angle YOZ, corresponding to positions of an aerial target which lie within altitudinal angles from 30° to 90°. I to IV designate four points which represent the points of impact of a projectile on an aerial target when the altitudinal angles of 0°, 30°, 60° and 90°, respectively, are concerned. All points of impact are at a distance or range $E_T$. The appertaining heights are $H_T{}^I = 0$, $H_T{}^{II} = E_T \sin 30° = 0.5\ E_T$, $H_T{}^{III} = E_T \sin 60° = 0.866\ E_T$ and $H_T{}^{IV} = E_T{}^{IV} = E_T \sin 90° = E_T$.

The instrument according to Figure 2 has a transparent plotting ribbon 1 which is assumed to move at a constant speed in the direction indicated by the arrow. The appertaining plotting pencil 2 is provided on a body 3 which is threaded inside and meshes with a threaded spindle 4 disposed below the ribbon 1 and at right angles to the direction of displacement of this ribbon. To prevent the body 3 from rotating about the axis of the spindle 4, this body 3 is guided along a shaft 5. The spindle 4 can be rotated by means of a pair of bevel wheels 6, a shaft 7 and a hand wheel 8. On the shaft 7 is provided a worm 9 which is in mesh with a worm wheel (not visible in the drawings) of an annular body 10 which has an index 11. This index 11 and an index 13 coordinated to a scale 12 and driven by a shaft 14 represent a follow-the-pointer mechanism. Above the ribbon 1 are provided two slides 15 and 16 which are displaceable in the direction of displacement of the plotting pencil 2. The displacement of the slide 15 is effected by means of a threaded spindle 17 in mesh with a female thread of this slide 15. To prevent a rotation of the slide 15 about the axis of the spindle 17, this slide 15 engages a guiding rod 18. The slide 15 is displaced by a differential gear 19 which is operated either by a hand wheel 20 on a shaft 21 on whose bent end is disposed the planet wheel 22 of the differential gear 19, or by a shaft 23 which rotates by means of a bevel wheel gear 24 the crown wheel 25 of the differential gear 19, this crown wheel being loosely rotatable on the shaft 21. The slide 16 has a female thread which is in mesh with a threaded spindle 26 rotatably mounted on a runner 27. By means of a rod 28, the runner 27 is displaceable in a guide 29 which is parallel to the direction of displacement of the plotting ribbon 1. The threaded spindle 26 is actuated by means of a bevel wheel gear 30, a spur wheel 31 and a toothed drum 32 fixed to the shaft 23. On the slide 15 a ruler 33 is so mounted as to be rotatable about an axis U—U, this axis and the point of the plotting pencil lying in a plane at right angles to the direction of displacement of the plotting ribbon. By means of a slit 34, the ruler 33 engages a pin 35 of the slide 16. An index 36 of the slide 16 indicates on a scale 37 of the runner 27 the distance of the axis of the pin 35 from a straight line O—O which corresponds to the magnitude zero of the range and the height of the point of impact. The free end of the ruler 33 is transparent and provided with a longitudinal line 40 passing through the axis of rotation U—U of the ruler and the axis of the pin 35. By means of this line 40, the position of the ruler may be made to correspond to the line 41 or the line determined by plotted points. The runner 27 and the two slides 15 and 16 are displaced by means of two rigidly interconnected cams 42 and 43 which are mounted on a square shaft 44 and may be displaced along this shaft by means of a gear comprising three toothed wheels 45, 46 and 47 and a cylindrical rack 48 connected to the cam 42. The toothed wheel 45 is provided with a hand crank 49, and the toothed wheel 46 has an index 50 which indicates on a stationary scale 51 the position the cam 42 assumes on the shaft 44, each position corresponding to a definite range of the point of impact of a projectile on the aerial target. By means of a spring 52, the rod 28 is made to continuously touch the cam 42. This cam 42 is so constructed that the distances of the different points of the bounding line of a cross-sectional area of this cam from the axis of rotation of the shaft 44 are equal to the differences of a constant distance and a distance which corresponds to the different times a projectile requires for arriving at those points of impact on the aerial target which are at the same distance from the calculating apparatus and have different altitudinal angles. The slide 27 is consequently always so adjusted when the cam 42 is displaced along the shaft 44 and when this shaft 44 is rotated that that component of the distance of the axis of rotation U—U of the ruler 33 from the axis of the pin 35 which lies in the direction of displacement of the plotting ribbon 1 corresponds continually to that time the projectile requires for arriving at the point of impact according to which the cam 42 is adjusted as regards the range and the altitudinal angle of the point of impact. A rack 54 in mesh with a spur wheel 55 is held in continuous contact with the cam 43 by means of a spring 53. Displacements of the rack 54 are transmitted by means of two bevel wheel gears 56 and 57 to the shaft 23 to which the toothed drum 32 is connected. The cross-sectional area of the cam 43 is illustrated by Figure 3, which shows that the bounding line of this cross-sectional area consists of a circular arc 58 which extends over a quadrant from A to B and a sinusoidal line 59 extending over two quadrants from B over C to D. The unused transition from the sinusoidal line to the circular arc is between D and A. Conditions are so chosen that, referring to a circle 60 representing the zero line, there hold good the following magnitudes for the radial distances of the bounding line at the points A, B, C and D, which correspond to the altitudinal angles 0°, 30°, 60° and 90°, respectively.

$$AA° = E_T,$$
$$BB° = E_T = H_T{}^{II'} = kH_T{}^{II} = kE_T \sin 30°,$$
$$CC° = H_T{}^{III'} = kH_T{}^{III} = kE_T \sin 60°,$$
$$DD° = H_T{}^{IV'} = kH_T{}^{IV} = kE_T \sin 90°,$$

in which $k = 1/\sin 30° = 2$ and $E_T$ represents to scale that range of the point of impact indicated on scale 51 by pointer 50 which is effective for the instrument and for which the cam 43 is so adjusted along the square shaft 44 as to assume such a position that its respective cross section contains the axis of the rod 54.

The described construction of the cam 43 is based on the condition that the pencil 2 plots the measured range of the aerial target when altitudinal angles of 0° to 30° are concerned, that is to say when the cam 43 assumes those positions in which the rod 54 is in contact with the circular part 58 of the bounding line of a cross-sectional area. Consequently, this range is to be supplied by the shaft 14. When altitudinal angles of 30° to 90° are concerned, that is to say when the cam 43 assumes positions in which the rod 54 is in contact with the sinusoidal part 59 of the bounding line of a cross-sectional area, the plotting pencil 2 is to plot the measured height of the aerial target. Consequently, the shaft 14 is to supply this height.

When the apparatus is used, the shaft 44 is to be rotated according to the altitudinal angle of the point of impact (which angle is to be determined by a device not represented in the drawings, for instance a device according to U. S. Patent specification 1,831,595) and the shaft 14 is to supply for altitudinal angles of 0° to 30° the range and for altitudinal angles of 30° to 90° twice the height of the aerial target (this range, or this height, being assumed to be determined by devices not represented in the drawings, for instance a device according to British patent specification 394,255). By rotating the hand wheel 8, care is to be taken that the following pointer 11 continuously coincides with the pointer 13 driven by means of the shaft 14. As a consequence the distance of the plotting pencil 2 from the zero line O—O corresponds to the supplied range or height. With a view to giving the ruler 33 the required adjustment and to thus make the longitudinal line 40 of this ruler coincide as exactly as possible with the line 41 plotted on the plotting ribbon 1 by the pencil 2, it is necessary to adjust both the inclination of the ruler 33 relative to the direction of displacement of the plotting ribbon 1 and the position of the axis of rotation U—U of the ruler 33 relative to the plotting ribbon 1. These adjustments are in part automatic. The automatic adjustment is due to a rotation of the shaft 44 according to the altitudinal angle of impact, because the runner 27 controls through the agency of the cam 42 the distance of the pin 35, which extends into the slit 34 of the ruler 33, from the axis of rotation U—U of the ruler 33, and because the cam 43 imparts with the aid of the gears 54, 55, 56, 57 and 32, 31, 30 and 23, 24, 19 equal rotations to the spindles 17 and 26 and equal displacements to the slides 15 and 16, on which the ruler 33 is mounted. An additional adjustment of the ruler 33 is to be effected by operators at the hand wheel 20 and the hand crank 49. The operator at the hand wheel 20 is to rotate the differential gear 19 and the spindle 17 in such a manner that the axis U—U is maintained over the plotting pencil 2, and the operator at the hand crank 49 is to displace the cam bodies 42 and 43 on the shaft 44 until the longitudinal line 40 of the ruler assumes the said desired position relative to the plotted line 41. The index 50 of the toothed wheel 46 then indicates on the scale 51 the sought range of the point of impact. When altitudinal angles 0° to 30° are concerned, this range is indicated also by the index 36 on the scale 37. When the altitudinal angles are between 30° and 90°, the magnitudes indicated by the index 36 on the scale 37 represent twice the heights of the point of impact.

I claim:

In a calculating apparatus for firing directors for shooting at moving aerial targets, a rectilinearly moving plotting ribbon adapted to be moved at constant speed, a plotting pencil movable in a direction at right angles to the moving direction of the plotting ribbon, an adjusting device for adjusting the plotting pencil according to the range of the aerial target, two slides movable parallel to the moving direction of the plotting pencil, means for adjusting these two slides through equal distances, other means for giving one of these two slides an additional adjustment, a ruler disposed on this one slide and rotatable about an axis at right angles to the plotting ribbon and lying in a plane at right angles to the moving direction of the plotting ribbon, said plane containing the point of the plotting pencil, this ruler having a slit, a pin disposed on the other of the said two slides and engaging the said slit, a runner for carrying this other slide, this runner being movable in the moving direction of the plotting ribbon, two cams, each of these cams being rotatable about and displaceable along an axis, these two cams being adapted to be adjusted according to the range and the altitudinal angle of the point of impact, the one of these two cams being so coupled to the said runner that this runner is displaced when the said cam is adjusted, this cam being so constructed that this displacement is of such a magnitude that that component of the distance of the axis of rotation on said one slide of the said ruler from the axis of the said pin on said other slide which lies in the moving direction of the plotting ribbon corresponds to the time of flight of a projectile to that point of impact on the aerial target according to which the cam is adjusted, the other of the said two cams being so coupled to the said means for adjusting the said two slides that these slides are displaced when the cam is adjusted, this other cam being so constructed that the displacement of the two slides is of such a magnitude that the position of the said pin corresponds to that range of the point of impact according to which the cam is adjusted.

KARL PAPELLO.